(12) United States Patent
Vicente et al.

(10) Patent No.: US 8,023,238 B2
(45) Date of Patent: Sep. 20, 2011

(54) UNIVERSAL TRIP UNIT

(75) Inventors: Nataniel Barbosa Vicente, Prospect, KY (US); Marcelo Esteban Valdes, Burlington, CT (US); Rafael Gutierrez, Jr., Farmington, CT (US)

(73) Assignee: General Electric Company, Schenectady, NY (US)

( * ) Notice: Subject to any disclaimer, the term of this patent is extended or adjusted under 35 U.S.C. 154(b) by 700 days.

(21) Appl. No.: 12/103,150

(22) Filed: Apr. 15, 2008

(65) Prior Publication Data

US 2009/0257160 A1 Oct. 15, 2009

(51) Int. Cl.
*H02H 3/08* (2006.01)
*H02H 9/02* (2006.01)

(52) U.S. Cl. ....... 361/93.2; 361/93.3; 702/122; 700/292

(58) Field of Classification Search ................. 361/93.3, 361/93.2; 702/122; 700/292
See application file for complete search history.

(56) References Cited

U.S. PATENT DOCUMENTS

| | | | | |
|---|---|---|---|---|
| 4,208,693 A | * | 6/1980 | Dickens et al. | 361/94 |
| 4,331,997 A | * | 5/1982 | Engel et al. | 361/93.2 |
| 4,649,455 A | * | 3/1987 | Scott | 361/93.3 |
| 4,901,219 A | * | 2/1990 | Erickson et al. | 363/146 |
| 4,958,252 A | * | 9/1990 | Murphy | 361/93.3 |
| 5,666,256 A | * | 9/1997 | Zavis et al. | 361/115 |
| 5,943,201 A | * | 8/1999 | Walker et al. | 361/64 |
| 6,005,757 A | * | 12/1999 | Shvach et al. | 361/64 |
| 6,078,489 A | * | 6/2000 | Messerli et al. | 361/87 |
| 6,356,426 B1 | * | 3/2002 | Dougherty | 361/102 |
| 6,678,135 B2 | * | 1/2004 | Tignor et al. | 361/93.3 |
| 6,788,512 B2 | * | 9/2004 | Vicente et al. | 361/93.1 |
| 7,685,327 B1 | * | 3/2010 | Jacobson et al. | 710/10 |

* cited by examiner

*Primary Examiner* — Rexford Barnie
*Assistant Examiner* — Zeev Kitov
(74) *Attorney, Agent, or Firm* — Cantor Colburn LLP

(57) ABSTRACT

A universal trip unit for use with a circuit breaker apparatus is provided and includes a communication unit configured to communicate with a personality module of the circuit breaker apparatus and to thereby receive key breaker personality parameters that relate to operational characteristics of the circuit breaker apparatus, and a controller. The controller includes a memory on which a universal register, previously stored key parameters and the received key breaker personality parameters are stored, the controller being configured to control the communication unit to receive the key breaker personality parameters in accordance with information determined from the universal register, and components to execute trip protection when at least one of a current and a voltage within the circuit breaker apparatus exceeds a respective predetermined threshold as defined by the previously stored key parameters and the received key breaker personality parameters.

20 Claims, 3 Drawing Sheets

UNIVERSAL TRIP UNIT

BACKGROUND OF THE INVENTION

Aspects of the present disclosure are directed to a trip unit and, more particularly, to a universal trip unit.

BRIEF DESCRIPTION OF THE BACKGROUND

In circuit breakers, the trip unit may be regarded as the brain of the circuit breaker. That is, the trip unit contains the microprocessor, a liquid crystal display (LCD), a rating plug, and an analog circuit to provide circuit protection. In this capacity, the trip unit receives information relating to current through a circuit breaker via current transformer and/or Rogowski sensors, and processes the information to provide feedback to a user or to provide trip functionality to the associate circuit breaker. The trip unit issues a trip signal to a breaker flux shifter that interrupts the current when the current exceeds a pre-defined threshold.

In practice, however, since operators of the circuit breakers may employ various types of circuit breakers they may be required to stock large numbers of spare trip units in case a particular trip unit for a particular type of circuit breaker fails. The required stocking of the large numbers of the spare trip units may be expensive in terms of occupied space and associated costs.

SUMMARY OF THE INVENTION

In accordance with an aspect of the invention, a universal trip unit for use with a circuit breaker apparatus is provided and includes a communication unit configured to communicate with a personality module of the circuit breaker apparatus and to thereby receive key breaker personality parameters that relate to operational characteristics of the circuit breaker apparatus, and a controller, including a memory on which a universal register, previously stored key parameters and the received key breaker personality parameters are stored, the controller being configured to control the communication unit to receive the key breaker personality parameters in accordance with information determined from the universal register, and components to execute trip protection when at least one of a current and a voltage within the circuit breaker apparatus exceeds a respective predetermined threshold as defined by the previously stored key parameters and the received key breaker personality parameters.

In accordance with another aspect of the invention, a universal trip unit is provided and includes a power supply unit, a communication unit, coupled to the power supply unit and configured to receive key breaker personality parameters, and a controller, including a memory on which a universal register, previously stored key parameters and the received key breaker personality parameters are stored, the controller being configured to control the communication unit to receive the key breaker personality parameters in accordance with information determined from the universal register, and components to execute trip protection in accordance with sensed conditions as defined by the previously stored key parameters and the received key breaker personality parameters.

In accordance with another aspect of the invention, a method of operating a universal trip unit of a circuit breaker apparatus is provided and includes recognizing a universal register of the universal trip unit as identifying the universal trip unit as such, receiving key breaker personality parameters from the circuit breaker apparatus in accordance with information determined from the universal register, and controlling component of the universal trip unit to execute trip protection when at least one of a current and voltage within the circuit breaker apparatus exceed respective predetermined thresholds as defined by previously stored key parameters and the received key breaker personality parameters.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
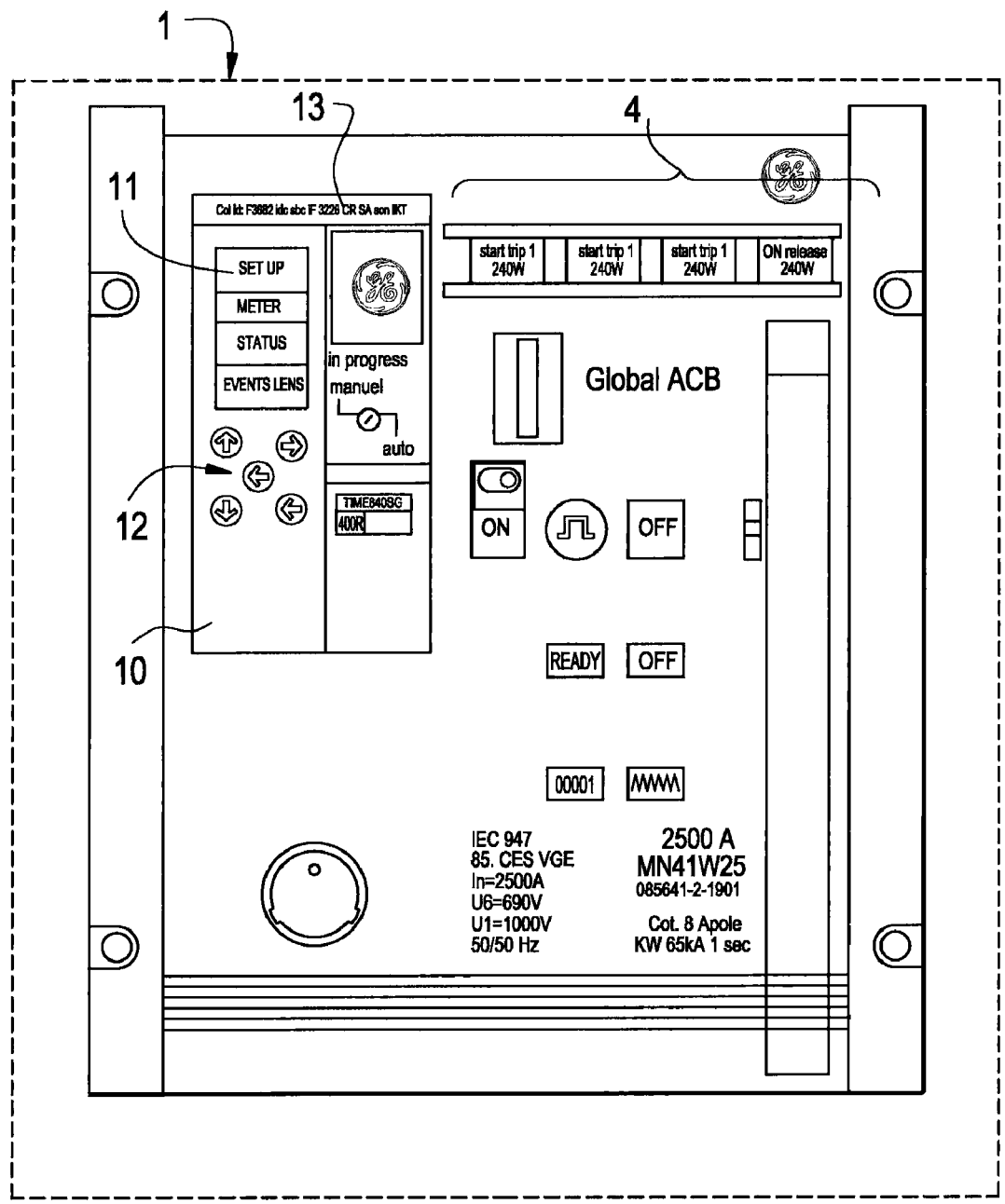
FIG. 1 is a view of a circuit breaker apparatus in accordance with an embodiment of the invention.
Figure 2:
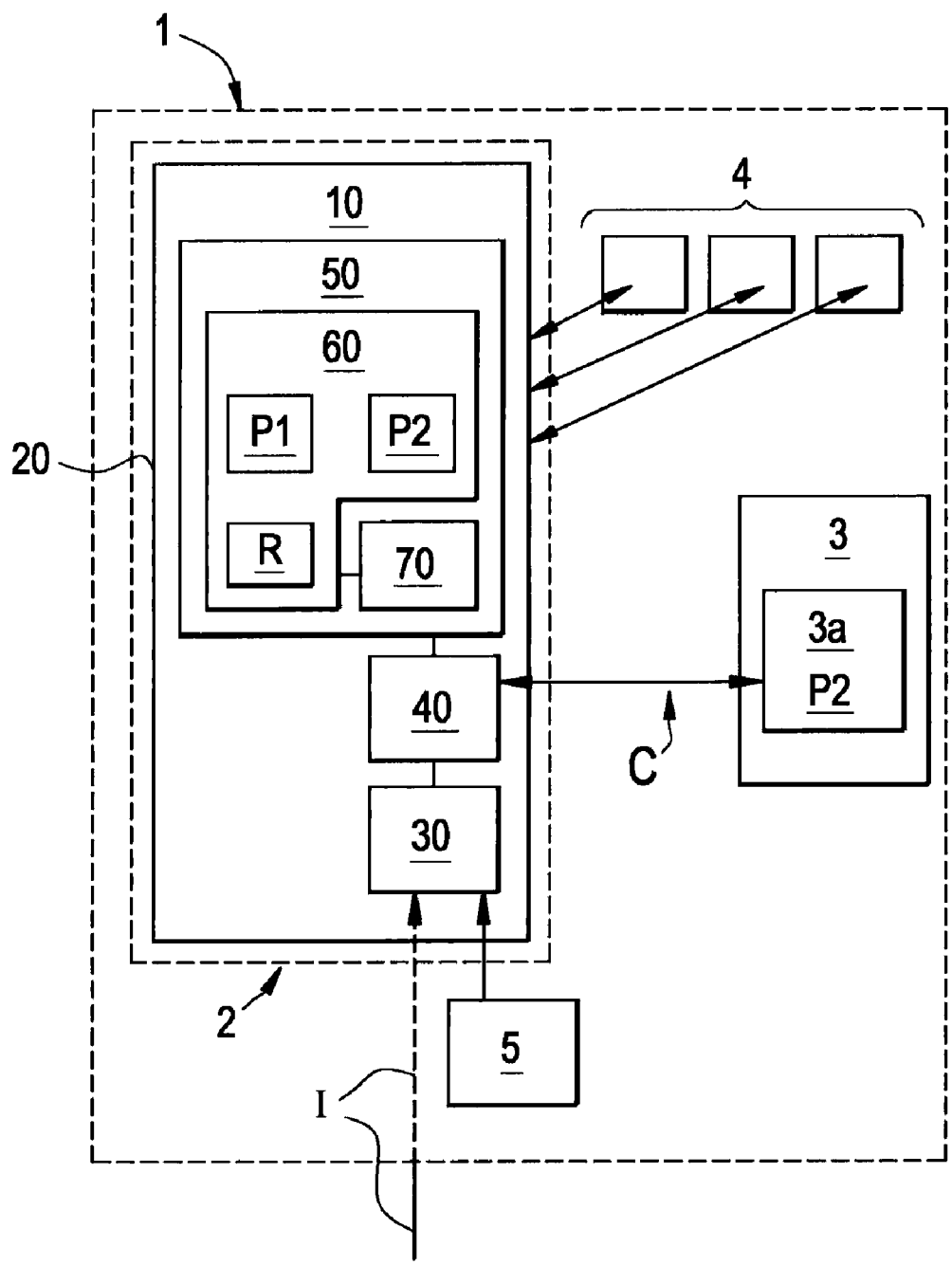
FIG. 2 is a schematic view of a circuit breaker apparatus in accordance with an embodiment of the invention.

With reference to FIGS. 1 and 2, a universal trip unit 10 for use with a circuit breaker apparatus 1 is provided. Here, the circuit breaker apparatus 1 may be any circuit breaker currently on the market or in operation and the universal trip unit 10 is configured to be operable with many of these. Generally, the circuit breaker apparatus 1 includes a receiving unit 2 having a shape and size sufficient to receive the universal trip unit 10 therein, a personality module 3 and, optionally, accessories 4, which may include a shunt trip, an under-voltage release, a close coil, etc., and may include a liquid crystal display (LCD) 11, menu buttons 12 to allow an operator to operate the universal trip unit 10 and part identification numbers 13.

The personality module 3 contains a memory, such as a non-volatile memory unit 3a, to store certain information. This information may include key breaker personality parameters P2 that determine levels of trip protection to be provided by the circuit breaker apparatus 1. The key breaker personality parameters P2 may include, but are not limited to, a frame size, a short circuit rating, a sensor, and Circuit Breaker (CB) standards, such as International Electro-technical Commission (IEC) standards, Underwriters Laboratory (UL) standards or American National Standards Institute (ANSI) standards of the circuit breaker apparatus 1.

With the circuit breaker apparatus 1 constructed substantially in this manner, the universal trip unit 10 includes a housing 20 to allow for a removable insertion thereof into the receiving unit 2 of the circuit breaker apparatus 1, a power supply unit 30 to receive power when the housing 20 is inserted into the receiving unit 2, a communication unit 40, coupled to the power supply unit 30, to communicate with the personality module 3 and to receive the key breaker personality parameters P2 therefrom, and a controller 50. The controller 50 includes a memory 60, such as a non-volatile memory, on which a universal register R that identifies the universal trip unit 10 as such, previously stored key parameters P1, which relate to general operational characteristics of trip protection, and the received key breaker personality parameters P2 are stored. The controller 50 further includes components 70 that are configured to execute trip protection when at least one of a current and a voltage within the circuit breaker apparatus 1 exceeds a respective predetermined threshold as defined by the previously stored key parameters P1 and the received key breaker personality parameters P2.

When the universal trip unit 10 is inserted into the circuit breaker apparatus 1, the power supply unit 30 may receive power via current, 1, through the circuit breaker apparatus 1 or, alternately, from an auxiliary unit 5, such as a 24V auxiliary unit that may be coupled to the circuit breaker apparatus 1, the universal trip unit 10 or both. In this manner, the universal trip unit 10 is provided with power necessary to execute the trip protection of the circuit breaker apparatus 1.

The communication unit 40 may communicate with the personality module 3 in accordance with various embodiments of the invention. That is, the communication unit 40 may communicate via wired and/or wireless interfaces with the personality module 3. In one such embodiment, the communication unit 40 communicates with the personality module 3 along communication lines, C. Here, the communication lines, C, may include 5V+ wiring, ground wiring, and Inter-Integrated Circuit (12C) bus wiring so that communication between the communication unit 40 and the personality module 3 is possible through an 12C bus.

In accordance with embodiments of the invention, the universal register R may include numerical data that is saved in the non-volatile memory of the memory 60 or the controller 50, with the numerical data set to a specified value, such as zero. Upon the installation of the universal trip unit 10 into the circuit breaker apparatus 1, the controller 50 reads the universal register R saved in the memory 60 and, from information determined to be contained with the universal register R, thereby recognizes the universal trip unit 10 as such.

The controller 50 then controls the communication unit 40 to read the key breaker personality parameters P2 saved within the personality module 3 of the circuit breaker apparatus 1 in accordance with the information determined from the universal register R. Alternatively, the controller 50 may control the communication unit 40 to issue a request for the key breaker personality parameters P2 to the personality module 3 in accordance with the information determined from the universal register R. Once received, the key breaker personality parameters P2 are stored in the non-volatile memory of the memory 60 of the controller 50.

The components 70 of the controller 50 then execute the trip protection of the circuit breaker apparatus 1 when at least one of a current and a voltage within the circuit breaker apparatus 1 exceeds a respective predetermined threshold as defined by the previously stored key parameters P1 and the received key breaker personality parameters P2.

In accordance with another aspect of the invention, the universal trip unit 10 is provided and includes a power supply unit 30, a communication unit 40, coupled to the power supply unit 30 and configured to receive key breaker personality parameters P2, and a controller 50. The controller 50 includes a memory 60 on which a universal register R, previously stored key parameters P1 and the received key breaker personality parameters P2 are stored. The controller 50 is configured to control the communication unit 40 to receive the key breaker personality parameters P2 in accordance with information determined from the universal register R. In addition, the controller 50 further includes components 70 to execute trip protection in accordance with sensed conditions as defined by the previously stored key parameters P1 and the received key breaker personality parameters P2.

Figure 3:
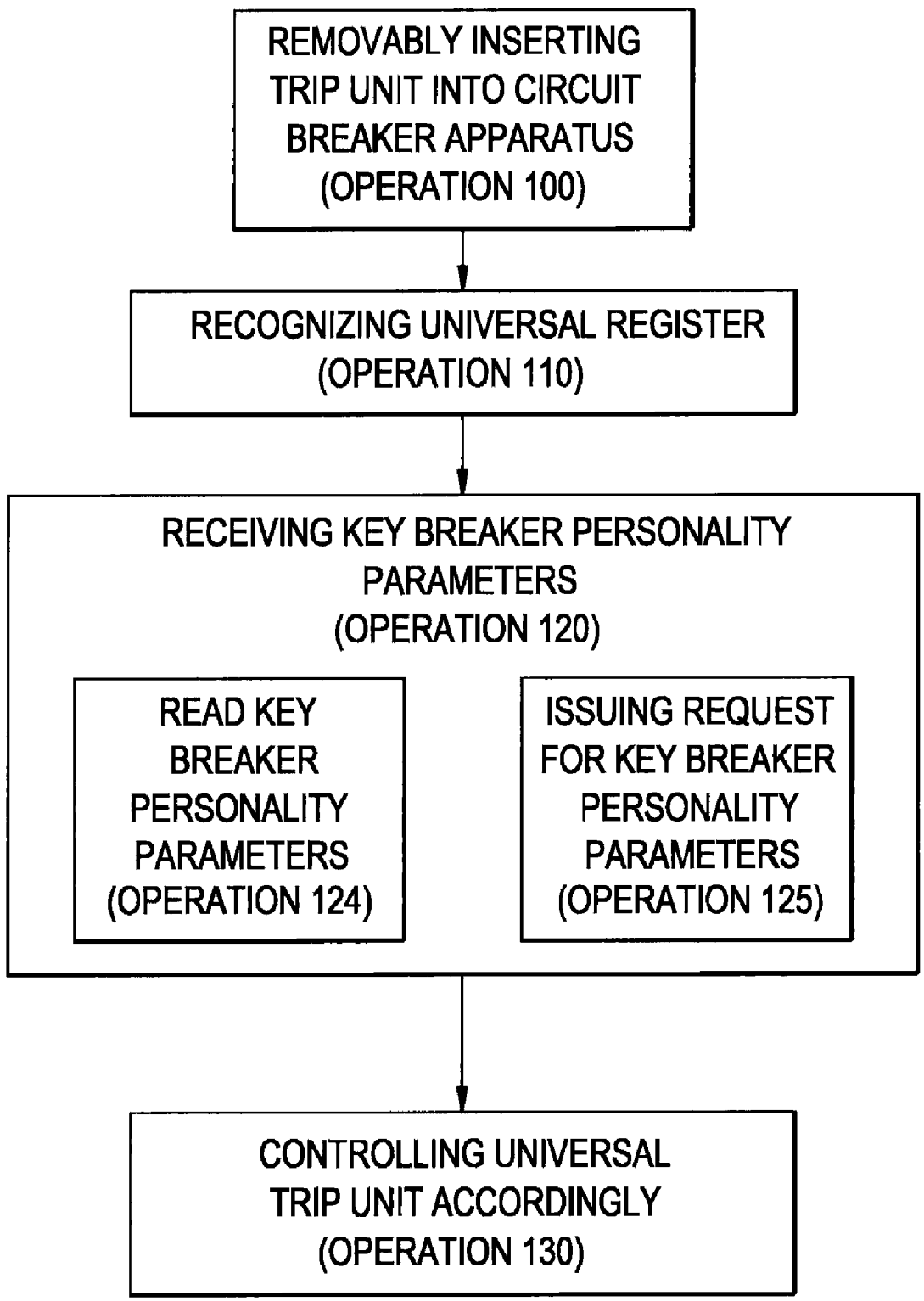
FIG. 3 is a flow diagram of a method of operating a circuit breaker apparatus in accordance with an embodiment of the invention.

In accordance with yet another aspect of the invention and with reference to FIG. 3, a method of operating a universal trip unit 10 of a circuit breaker apparatus 1 is provided and includes recognizing a universal register R of the universal trip unit 10 as identifying the universal trip unit 10 as such (operation 110), receiving key breaker personality parameters P2 from the circuit breaker apparatus 1 in accordance with information determined from the universal register R (operation 120), and controlling components 70 of the universal trip unit 10 to execute trip protection when at least one of a current and a voltage within the circuit breaker apparatus 1 exceeds a respective predetermined threshold as defined by previously stored key parameters P1 and the received key breaker personality parameters P2 (operation 130).

In accordance with further embodiments of the invention, the receiving of the key breaker personality parameters P2 (operation 120) may further include reading the key breaker personality parameters P2 in accordance with the information determined from the universal register R (operation 124), and/or issuing a request for the key breaker personality parameters P2 in accordance with the information determined from the universal register R (operation 125).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A universal trip unit for use with any one of multiple circuit breaker apparatuses each having a personality module and into each one of which the universal trip unit is installable, the universal trip unit comprising:

a communication unit configured to communicate with the personality module of the one of the multiple circuit breaker apparatuses and to thereby receive from the personality module key breaker personality parameters that relate to operational characteristics of the circuit breaker apparatus; and a controller, including:

a memory on which a universal register, previously stored key parameters and the received key breaker personality parameters are stored, the controller being configured to control the communication unit to receive the key breaker personality parameters of the selected-one of the multiple circuit breaker apparatuses from the personality module thereof in accordance with information determined from the universal register upon installation of the universal trip unit in the one of the multiple circuit breaker apparatuses, and components to execute trip protection when at least one of a current and a voltage within the circuit breaker apparatus exceeds a respective predetermined threshold as defined by the previously stored key parameters and the received key breaker personality parameters.

2. The universal trip unit according to claim 1, further comprising a housing to allow for a removable insertion of the universal trip unit into a receiving unit of the circuit breaker apparatus.

3. The universal trip unit according to claim 1, further comprising a power supply unit to receive power from the circuit breaker apparatus.

4. The universal trip unit according to claim 1, further comprising a power supply unit to receive power from a 24V auxiliary unit.

5. The universal trip unit according to claim 1, wherein the universal register comprises numerical data set to a specified value.

6. The universal trip unit according to claim 5, wherein the controller is configured to recognize the specified value of the universal register.

7. The universal trip unit according to claim 5, wherein the specified value of the universal register is set to zero.

8. The universal trip unit according to claim 1, wherein the key breaker personality parameters comprise at least a frame size, a short circuit rating, a sensor, and a circuit breaker (CB) standard of the circuit breaker apparatus.

9. The universal trip unit according to claim 1, wherein the controller controls the communication unit to read the key breaker personality parameters in accordance with the information determined from the universal register.

10. The universal trip unit according to claim 1, wherein the controller controls the communication unit to request a transmission of the key breaker personality parameters in accordance with the information determined from the universal register.

11. The universal trip unit according to claim 1, wherein the memory of the controller comprises a non-volatile memory.

12. A universal trip unit comprising:
a power supply unit;
a communication unit, coupled to the power supply unit and configured to receive key breaker personality parameters from a personality module of any one of multiple circuit breaker apparatuses into which the universal trip unit is installed; and
a controller, including:
a memory on which a universal register, previously stored key parameters and the received key breaker personality parameters are stored, the controller being configured to control the communication unit to receive the key breaker personality parameters of the one of the multiple circuit breaker apparatuses from the personality module thereof in accordance with information determined from the universal register upon installation of the universal trip unit in the one of the multiple circuit breaker apparatuses, and components to execute trip protection in accordance with sensed conditions as defined by the previously stored key parameters and the received key breaker personality parameters.

13. The universal trip unit according to claim 1, wherein the universal register comprises numerical data set to a specified value.

14. The universal trip unit according to claim 12, wherein the key breaker personality parameters comprise data reflective of at least a frame size, a short circuit rating, a sensor, and a circuit breaker (CB) standard.

15. The universal trip unit according to claim 12, wherein the controller controls the communication unit to read the key breaker personality parameters in accordance with the information determined from the universal register.

16. The universal trip unit according to claim 12, wherein the controller controls the communication unit to request a transmission of the key breaker personality parameters in accordance with the information determined from the universal register.

17. The universal trip unit according to claim 12, wherein the memory of the controller comprises a non-volatile memory.

18. A method of operating a universal trip unit for installation in any one of multiple circuit breaker apparatuses each having a personality module, the method comprising:
recognizing upon installation of the universal trip unit in the one of the multiple circuit breaker apparatuses a universal register of the universal trip unit;
following the recognizing, receiving key breaker personality parameters of the one of the multiple circuit breaker apparatuses from the personality module thereof in accordance with information determined from the universal register; and
controlling components of the universal trip unit to execute trip protection when at least one of a current and a voltage within the circuit breaker apparatus exceeds a respective predetermined threshold as defined by previously stored key parameters and the received key breaker personality parameters.

19. The method according to claim 18, wherein the receiving of the key breaker personality parameters comprises reading the key breaker personality parameters in accordance with the information determined from the universal register.

20. The method according to claim 18, wherein the receiving of the key breaker personality parameters comprises issuing a request for the key breaker personality parameters in accordance with the information determined from the universal register.

* * * * *